United States Patent
Song et al.

(10) Patent No.: US 11,368,463 B2
(45) Date of Patent: Jun. 21, 2022

(54) METHOD AND DEVICE FOR SHARING CONTROL RIGHTS OF APPLIANCES, STORAGE MEDIUM, AND SERVER

(71) Applicants: Gree Electric Appliances (Wuhan) Co., Ltd, Hubei (CN); Gree Electric Appliances, Inc. of Zhuhai, Guangdong (CN)

(72) Inventors: Dechao Song, Guangdong (CN); Liping Yao, Guangdong (CN); Jin Shen, Guangdong (CN); Haiying Xian, Guangdong (CN); Ying Wang, Guangdong (CN); Xianjun He, Guangdong (CN)

(73) Assignees: Gree Electric Appliances (Wuhan) Co., Ltd, Wuhan (CN); Gree Electric Appliances, Inc. of Zhuhai, Zhuhai (CN)

( * ) Notice: Subject to any disclaimer, the term of this patent is extended or adjusted under 35 U.S.C. 154(b) by 0 days.

(21) Appl. No.: 16/623,685

(22) PCT Filed: Jun. 19, 2018

(86) PCT No.: PCT/CN2018/091782
§ 371 (c)(1),
(2) Date: Dec. 17, 2019

(87) PCT Pub. No.: WO2019/062219
PCT Pub. Date: Apr. 4, 2019

(65) Prior Publication Data
US 2020/0228536 A1 Jul. 16, 2020

(30) Foreign Application Priority Data
Sep. 30, 2017 (CN) .......................... 201710915297.8

(51) Int. Cl.
*H04L 12/28* (2006.01)
*H04L 67/125* (2022.01)
*H04L 9/40* (2022.01)

(52) U.S. Cl.
CPC ........ *H04L 63/102* (2013.01); *H04L 12/2816* (2013.01); *H04L 63/104* (2013.01); *H04L 67/125* (2013.01)

(58) Field of Classification Search
CPC ... H04L 12/2816; H04L 63/104; H04L 63/10; H04L 67/125; H04L 63/102; G06Q 50/01; G06Q 10/10
See application file for complete search history.

(56) References Cited

U.S. PATENT DOCUMENTS

| | | | | |
|---|---|---|---|---|
| 2010/0306825 | A1* | 12/2010 | Spivack | H04L 69/28 726/4 |
| 2014/0242940 | A1* | 8/2014 | Koo | H04W 4/70 455/406 |

(Continued)

FOREIGN PATENT DOCUMENTS

| | | |
|---|---|---|
| CN | 104460365 A | 3/2015 |
| CN | 104735057 A | 6/2015 |

(Continued)

OTHER PUBLICATIONS

International Search Report, dated Sep. 5, 2018, in International application No. PCT/CN2018/091782, filed on Jun. 19, 2018.

*Primary Examiner* — Frantz B Jean
(74) *Attorney, Agent, or Firm* — McAndrews, Held & Malloy, Ltd.

(57) ABSTRACT

The present disclosure provides a method and device for sharing control rights of appliances, a storage medium, and a server. The method includes that: a sharing request is received from a first user for sharing a control right of at least one appliance with at least one second user; and in (Continued)

response to the sharing request, a sharing operation of sharing the control right of the at least one appliance with the at least one second user is performed, so that both the first user and the at least one second user share the control right of the at least one appliance.

15 Claims, 8 Drawing Sheets

(56) References Cited

U.S. PATENT DOCUMENTS

| | | | | |
|---|---|---|---|---|
| 2015/0373022 | A1* | 12/2015 | Dubman | H04L 63/10 |
| | | | | 726/3 |
| 2016/0134932 | A1* | 5/2016 | Karp | H04L 67/22 |
| | | | | 348/155 |
| 2016/0234213 | A1* | 8/2016 | Kim | H04W 12/04 |
| 2017/0003736 | A1* | 1/2017 | Turon | H04L 12/2816 |
| 2017/0126689 | A1* | 5/2017 | Lloyd | G06F 3/04847 |
| 2018/0173906 | A1* | 6/2018 | Rodriguez | H04L 63/0807 |

FOREIGN PATENT DOCUMENTS

| | | | | |
|---|---|---|---|---|
| CN | 105681140 | A | 6/2016 | |
| CN | 105763418 | A | 7/2016 | |
| CN | 106506550 | A | 3/2017 | |
| CN | 104735057 | * | 2/2018 | H04L 12/2807 |
| CN | 107872373 | A | 4/2018 | |

* cited by examiner

METHOD AND DEVICE FOR SHARING CONTROL RIGHTS OF APPLIANCES, STORAGE MEDIUM, AND SERVER

CROSS-REFERENCE TO RELATED APPLICATIONS

This application is a 371 of International Patent Application No. PCT/CN2018/091782, filed Jun. 19, 2018, which claims priority to Chinese Patent No. 201710915297.8, titled Method and Device for Sharing Control Rights of Appliances, Storage Medium, and Server, filed on Sep. 30, 2017, the contents of both of which are hereby incorporated by reference in their entirety.

TECHNICAL FIELD

The present disclosure relates to the control field, and in particular to a method and device for sharing control rights of appliances, a storage medium, and a server.

BACKGROUND

At present, remote management control and near field management control, or remote management control, or near field management control of smart home is realized by means of management applications (such as an application (APP), a personal computer (PC) management platform, and web management). For example, appliances at home are controlled remotely through a mobile APP. However, there is no solution known to the inventors of sharing control rights of appliances of one user with other users. After an appliance is installed and distributed with a network, multiple family members manage at least one bound appliance through a management account. And when a friend is visiting, this friend manually controls the at least one bound appliance or controls the at least one bound appliance through the management account of the user, so it is troublesome.

SUMMARY

At least some embodiments of the present disclosure provide a method and device for sharing control rights of appliances, a storage medium, and a server, so as to at least partially solve the problem known to the inventors that control rights of appliances of one user is not shared with other users.

In some embodiments of the present disclosure, a method for sharing control rights of appliances is provided. The method includes the following steps. A sharing request is received from a first user for sharing a control right of at least one appliance with at least one second user. In response to the sharing request, a sharing operation of sharing the control right of the at least one appliance with the at least one second user is performed, so that both the first user and the at least one second user share the control right of the at least one appliance.

In some embodiments of the present disclosure, a device for sharing control rights of appliances is provided. The device includes: a first receiving element and a first performing element. The first receiving element is configured to receive the sharing request from the first user for sharing the control right of at least one appliance with at least one second user. The first performing element is configured to perform, in response to the sharing request received by the first receiving element, the sharing operation of sharing the control right of the at least one appliance with the at least one second user, so that both the first user and the at least one second user share the control right of the at least one appliance.

In some embodiments of the present disclosure, a computer-readable storage medium is provided, on which a computer program is stored. When executed by a processor, the computer program implements the steps of any above method.

In some embodiments of the present disclosure, a server is provided. The server includes a processor, a memory, and a computer program stored on the memory and capable of running on the processor. When executing the program, the processor implements the steps of any above method.

In some embodiments of the present disclosure, a server is provided. The server includes any above device for sharing control rights of appliances.

By means of at least some technical solutions of the present disclosure, the control right of the at least one appliance managed by the first user is shared with the at least one second user, thereby implementing the sharing of control rights of appliances, and further implementing joint management of the appliances by multiple users. In such a manner, when a user wants other users to manage at least one appliance, this user shares the control right of the appliance easily and quickly.

BRIEF DESCRIPTION OF THE DRAWINGS

The accompanying drawings described here are used for providing further understanding of the present disclosure, and constitute a part of the present disclosure. Schematic embodiments of the present disclosure and description thereof are used for illustrating the present disclosure and are not intended to form an improper limit to the present disclosure. In the accompanying drawings.

DETAILED DESCRIPTION

In order to make the purpose, technical solutions and advantages of the present disclosure clearer, the technical solutions of the present disclosure will be described below clearly and completely in combination with the specific embodiments of the present disclosure and the corresponding drawings. It is apparent that the described embodiments are a part of the embodiments of the present disclosure but not all. On the basis of the embodiment of the present disclosure, all other embodiments obtained on the premise of no creative work of those skilled in the art fall within the protection scope of the present disclosure.

It is to be noted that the terms like "first" and "second" in the specification, claims and accompanying drawings of the present disclosure are used for differentiating the similar objects, but do not have to describe a specific order or a sequence. It should be understood that the objects may be exchanged under appropriate circumstances, so that the embodiments of the present disclosure described here may be implemented in an order different from that described or shown here. Moreover, the terms like "include" and "have" and any variation of them are intended to cover nonexclusive including; for example, the process, method, system, product or device including a series of steps or elements do not have to be limited to those clearly listed steps or elements, but may include other steps or elements which are not clearly listed or inherent in these process, method, system, product or device.

Figure 1:
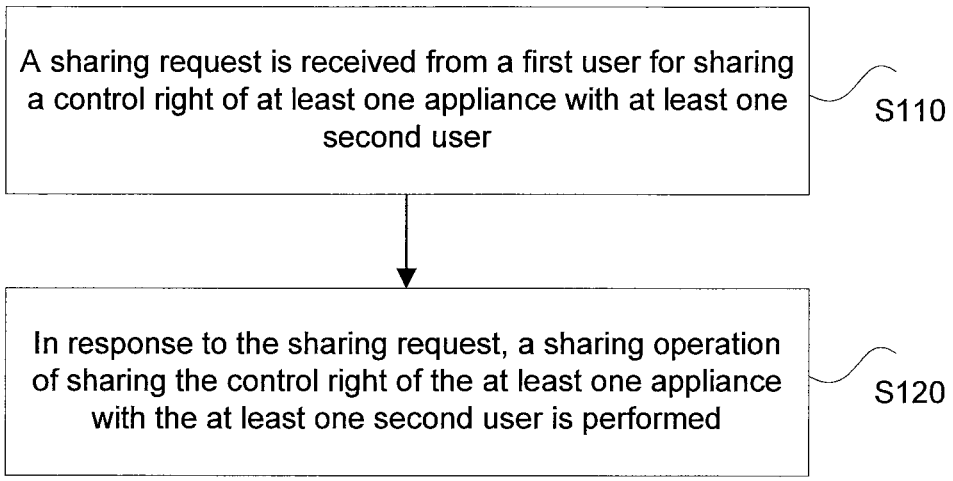
FIG. 1 is a schematic diagram of a method for sharing control rights of appliances according to an embodiment of the present disclosure.

FIG. 1 is a schematic diagram of a method for sharing control rights of appliances according to an embodiment of the present disclosure. The method may be applied to a server side.

As shown in FIG. 1, according to this embodiment of the present disclosure, the method for sharing control rights of appliances at least includes step S110 and step S120.

At step S110, a sharing request is received from a first user for sharing a control right of at least one appliance with at least one second user.

That is, the first user shares the control right of the at least one appliance with multiple other users. The at least one appliance is selected by the first user from appliances which are managed by an account of the first user. The first user has at least one account. For example, if the first user has multiple houses, an account (a family ID) for managing and controlling appliances is set up aiming at each house. The first user initiates a sharing request after selecting the appliance, the control right of which is to be shared, for example, the first user clicks a "share" button displayed on a user page to initiate the sharing request.

At step S120, in response to the sharing request, a sharing operation of sharing the control right of the at least one appliance with the at least one second user is performed.

Specifically speaking, a control relationship between the at least one second user and the at least one appliance is added in a control relationship list, so as to establish the control relationship between the at least one second user and the at least one appliance. The control relationship list is used for saving the control relationships between users and appliances. The control relationship list of users and appliances is pre-saved. The control relationship list is saved in a server. When the sharing operation of sharing the control right of the at least one appliance with the at least one second user is performed, the control relationship between the at least one second user and the at least one appliance is added in the pre-saved control relationship list of users and appliances. The control relationship between the user and the appliance is specifically the control relationship between the account of the user and the appliance. After the sharing operation of sharing the control right of the at least one appliance with the at least one second user is performed, both the first user and the at least one second user share the control right of the at least one appliance. The first user and the at least one second user may control the at least one appliance together.

After the sharing operation of sharing the control right of the at least one appliance with the at least one second user is performed, the first user and the at least one second user, or the first user, or the at least one second user may display a result of sharing by refreshing a page of a management application. Each user having the control right of the at least one appliance is displayed on the page of the management application of the first user, and the appliance, which is controlled, of the first user is displayed on the page of the management application of the at least one second user.

Figure 2:
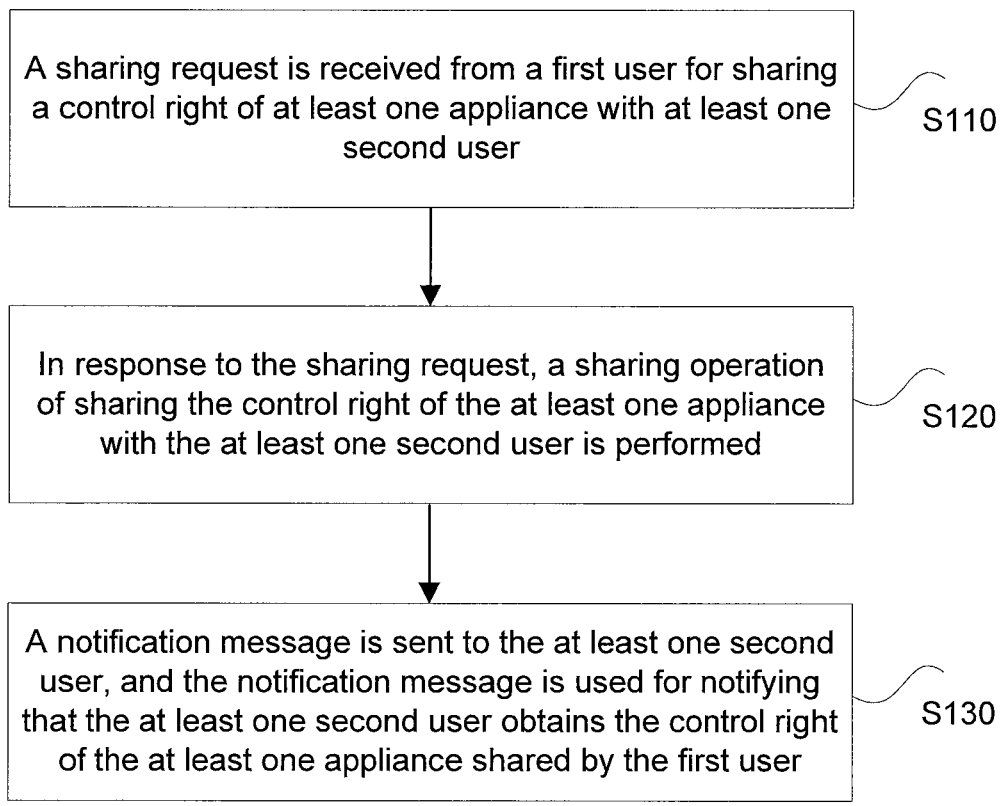
FIG. 2 is a schematic diagram of a method for sharing control rights of appliances according to another embodiment of the present disclosure.

FIG. 2 is a schematic diagram of a method for sharing control rights of appliances according to another embodiment of the present disclosure. As shown in FIG. 2, based on the above embodiment, the method for sharing control rights of appliances further includes step S130. Step S130 is performed after step S120.

At step S130, a notification message is sent to the at least one second user, and the notification message is used for notifying that the at least one second user obtains the control right of the at least one appliance shared by the first user.

Specifically, after the sharing operation of sharing the control right of the at least one appliance with the at least one second user is performed, the notification message the at least one second user, and the notification message is used for notifying that the at least one second user obtains the control right of the at least one appliance shared by the first user, so that the at least one second user manages the at least one appliance after learning that the at least one second user obtains the control right of the at least one appliance.

Figure 3:
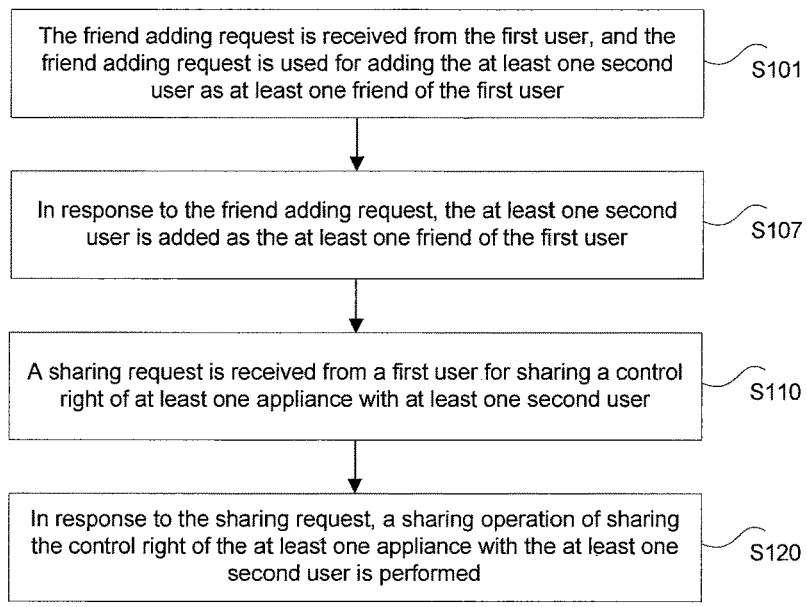
FIG. 3 is a schematic diagram of a method for sharing control rights of appliances according to another embodiment of the present disclosure.

FIG. 3 is a schematic diagram of a method for sharing control rights of appliances according to another embodiment of the present disclosure. As shown in FIG. 3, based on any above embodiment, the method for sharing control rights of appliances further includes step S101 and step S107. Step S101 and step S107 are performed before step S110.

At step S101, the friend adding request is received from the first user, and the friend adding request is used for adding the at least one second user as at least one friend of the first user.

Specifically, when the at least one second user is at least one friend of the first user, the control right of the at least one appliance managed by the first user is shared with the at least one second user, so the first user first requests for adding the at least one second user as the at least one friend of the first user, and then shares the control right of the at least one appliance with the at least one second user.

At step S107, in response to the friend adding request, the at least one second user is added as the at least one friend of the first user.

Specifically, the at least one second user is added in a friend list of the first user, for example, the account of the at least one second user is added. Furthermore, after the at least one second user is added as the at least one friend of the first user, a prompt message that the at least one second user has been added as the at least one friend is also returned to the first user.

Figure 4:
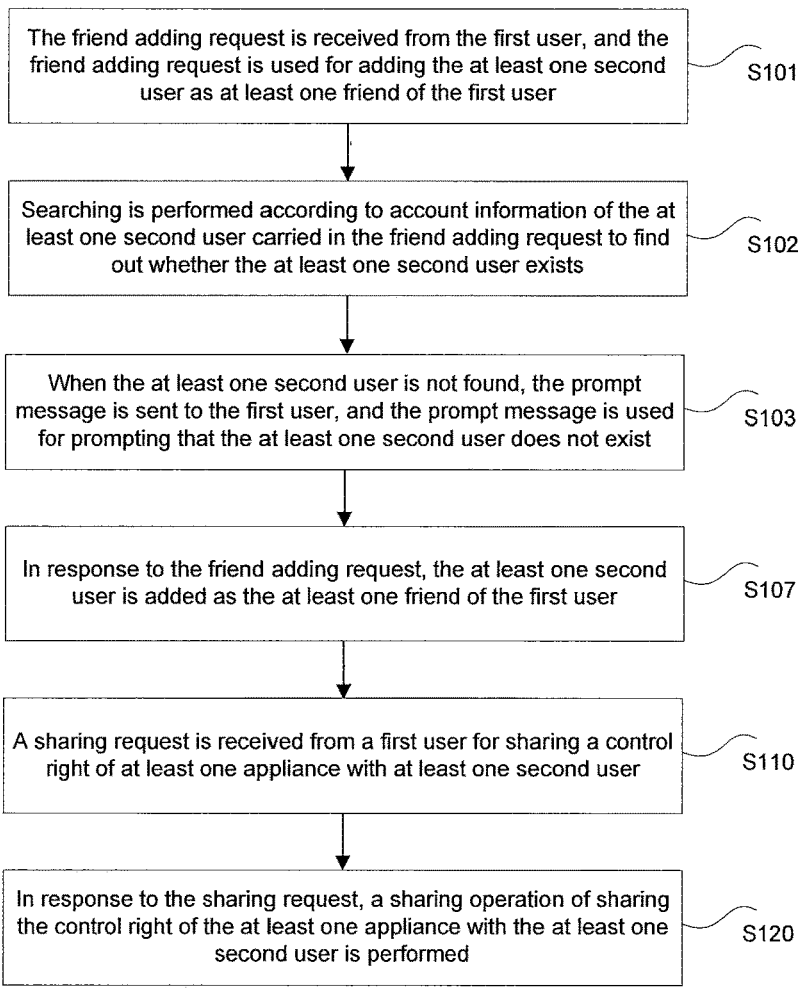
FIG. 4 is a schematic diagram of a method for sharing control rights of appliances according to another embodiment of the present disclosure.

FIG. 4 is a schematic diagram of a method for sharing control rights of appliances according to another embodiment of the present disclosure. As shown in FIG. 4, based on any above embodiment, the method for sharing control rights of appliances further includes step S102 and step S103, which are performed after step S101 and before step S107.

At S102, searching is performed according to account information of the at least one second user carried in the friend adding request to find out whether the at least one second user exists.

The account information includes at least one of an e-mail address, a mobile phone number and a user name. When the at least one second user is not found, it is showed that the at least one second user does not exist, and step S103 is performed. When the at least one second user is found, step S107 is performed, and the at least one second user is added as the at least one friend of the first user.

At step S103, when the at least one second user is not found, the prompt message is sent to the first user, and the prompt message is used for prompting that the at least one second user does not exist.

For example, it is prompted that the account information entered by the first user is wrong, and then the first user checks and reenters the account information.

Figure 5:
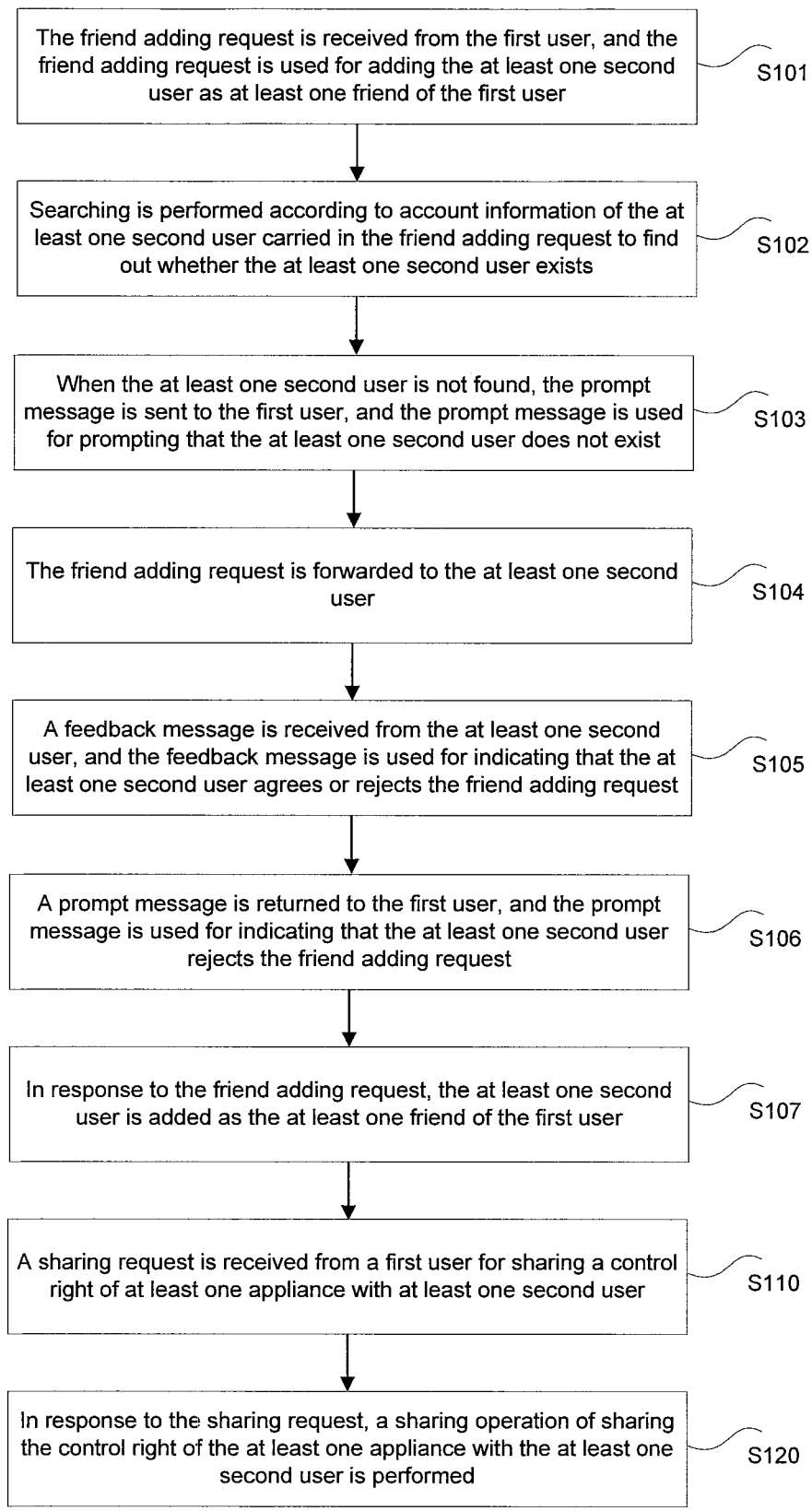
FIG. 5 is a schematic diagram of a method for sharing control rights of appliances according to another embodiment of the present disclosure.

FIG. 5 is a schematic diagram of a method for sharing control rights of appliances according to another embodiment of the present disclosure. As shown in FIG. 5, based on any above embodiment, the method for sharing control rights of appliances further includes step S104, step S105, and step S106, which may be performed after step S103 and before step S107.

At step S104, the friend adding request is forwarded to the at least one second user.

If adding the at least one second user as the at least one friend needs an agreement of the at least one second user (for example, the at least one second user sets that an agreement is required to add a friend), when the friend adding request of adding the at least one second user as the at least one friend sent by the first user is received, the friend adding request of the first user is forwarded to the at least one second user.

At step S105, a feedback message is received from the at least one second user, and the feedback message is used for indicating that the at least one second user agrees or rejects the friend adding request.

After receiving the forwarded friend adding request, when the at least one second user agrees to become at least one friend of the first user, the at least one second user returns the feedback message indicating that the at least one second user agrees the friend adding request. For example, the at least one second user clicks an "agree" button. When the at least one second user does not agree to become at least one friend of the first user, the at least one second user returns the feedback message indicating that the at least one second user rejects the friend adding request (to a server). For example, the at least one second user clicks a "reject" button. When the feedback message indicating that the at least one second user rejects the friend adding request is received from the at least one second user, step S106 is performed. When the feedback message indicating that the at least one second user agrees the friend adding request is received from the at least one second user, step S107 is performed, and the at least one second user is added as the at least one friend of the first user.

At step S106, a prompt message is returned to the first user, and the prompt message is used for indicating that the at least one second user rejects the friend adding request.

For example, after the feedback message indicating that the at least one second user rejects the friend adding request is received, the prompt message "your friend adding request is rejected" is returned to the first user.

Figure 6:
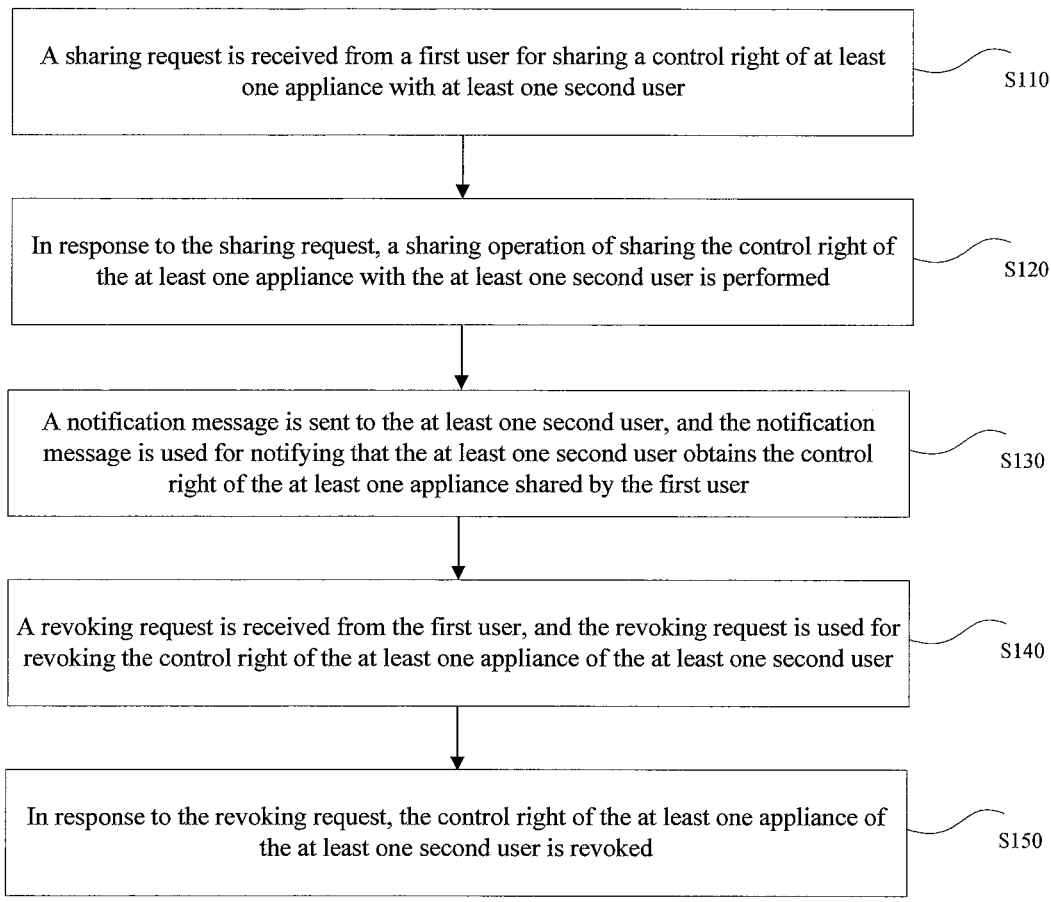
FIG. 6 is a schematic diagram of a method for sharing control rights of appliances according to another embodiment of the present disclosure.

FIG. 6 is a schematic diagram of a method for sharing control rights of appliances according to another embodiment of the present disclosure. As shown in FIG. 6, based on any above embodiment, the method for sharing control rights of appliances further includes step S140 and step S150, which are performed after step S120 or step S130.

At step S140, a revoking request is received from the first user, and the revoking request is used for revoking the control right of the at least one appliance of the at least one second user.

For example, when the first user does not want the at least one second user to help managing the appliances, the first user revokes the control right of the at least one second user, namely sending the revoking request for revoking the control right of the at least one appliance of the at least one second user.

At step S150, in response to the revoking request, the control right of the at least one appliance of the at least one second user is revoked.

After the revoking request from the first user for revoking the control right of the at least one appliance of the at least one second user is received, the operation of revoking the control right of the at least one appliance of the at least one second user is performed. Specifically, the control relationship between the at least one second user and the at least one appliance is deleted from the control relationship list.

Figure 7:
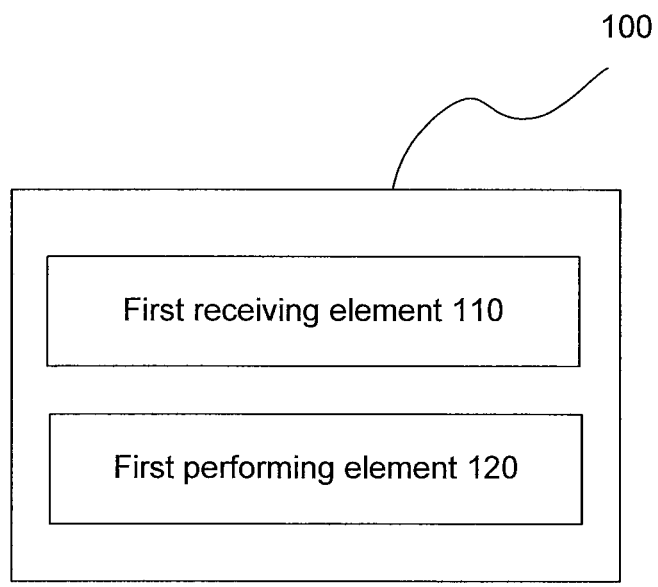
FIG. 7 is a structural schematic diagram of a device for sharing control rights of appliances according to an embodiment of the present disclosure.

FIG. 7 is a structural schematic diagram of a device for sharing control rights of appliances according to an embodiment of the present disclosure. As shown in FIG. 7, the device for sharing control rights of appliances 100 includes: a first receiving element 110 and a first performing element 120.

The first receiving element 110 is configured to receive the sharing request from the first user for sharing the control right of at least one appliance with at least one second user. The first performing element 120 is configured to perform, in response to the sharing request received by the first receiving element, the sharing operation of sharing the control right of the at least one appliance with the at least one second user, so that both the first user and the at least one second user share the control right of the at least one appliance.

That is, the first user shares the control right of the at least one appliance with multiple other users. The at least one appliance is selected by the first user from appliances which are managed by an account of the first user. The first user hays at least one account. For example, if the first user has multiple houses, an account (a family ID) for managing and controlling appliances is set up aiming at each house. The first user initiates a sharing request after selecting the appliance, the control right of which is to be shared, for example, the first user clicks a "share" button displayed on a user page to initiate the sharing request.

Specifically speaking, the first performing element 120 adds, in response to the sharing request received by the first receiving element, the control relationship between the at least one second user and the at least one appliance in the control relationship list, so as to establish the control relationship between the at least one second user and the at least one appliance. The control relationship list is used for saving the control relationships between users and appliances. The control relationship list of users and appliances is pre-saved. The control relationship list may be saved in the server. When the first performing element 120 performs the sharing operation of sharing the control right of the at least one appliance with the at least one second user, the control relationship between the at least one second user and the at least one appliance is added in the pre-saved control relationship list of the user and the appliance. The control relationship between the user and the appliance is specifically the control relationship between the account of the user and the appliance. After the sharing operation of sharing the control right of the at least one appliance with the at least one second user is performed, both the first user and the at least one second user share the control right of the at least one appliance. The first user and the at least one second user may control the at least one appliance together.

Figure 8:
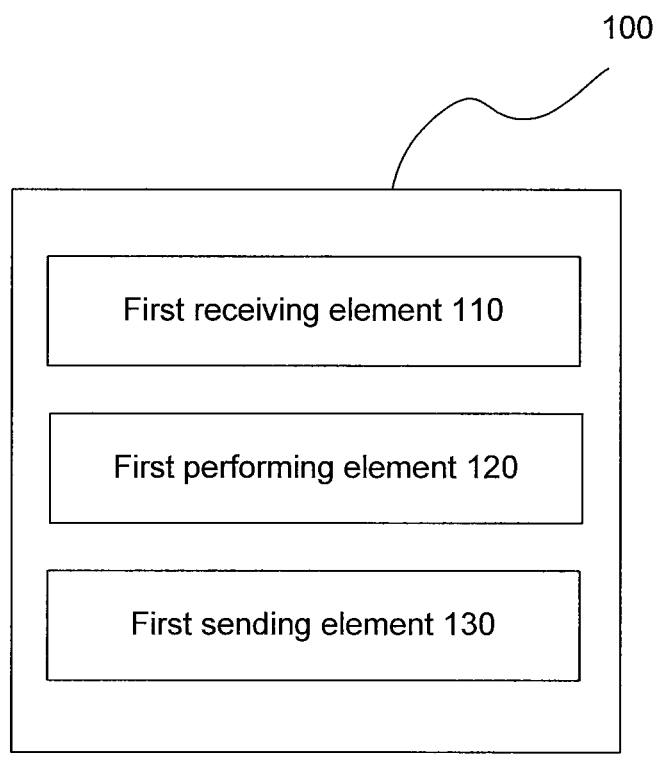
FIG. 8 is a structural schematic diagram of a device for sharing control rights of appliances according to another embodiment of the present disclosure.

FIG. 8 is a structural schematic diagram of a device for sharing control rights of appliances according to another embodiment of the present disclosure. As shown in FIG. 8, based on the above embodiment, the device for sharing control rights of appliances 100 further includes a first sending element 130.

The first sending element 130 is configured to send, after the first performing element performs the sharing operation of sharing the control right of the at least one appliance with the at least one second user, a notification message to the at least one second user, and the notification message is used for notifying that the at least one second user obtains the control right of the at least one appliance shared by the first user.

Specifically, after the first performing element 120 performs the sharing operation of sharing the control right of the at least one appliance with the at least one second user, the first sending element 130 sends the notification message notifying that the at least one second user obtains the control right of the at least one appliance shared by the first user to the at least one second user, so that the at least one second user controls the at least one appliance after learning that the at least one second user obtains the control right of the at least one appliance shared by the first user.

Figure 9:
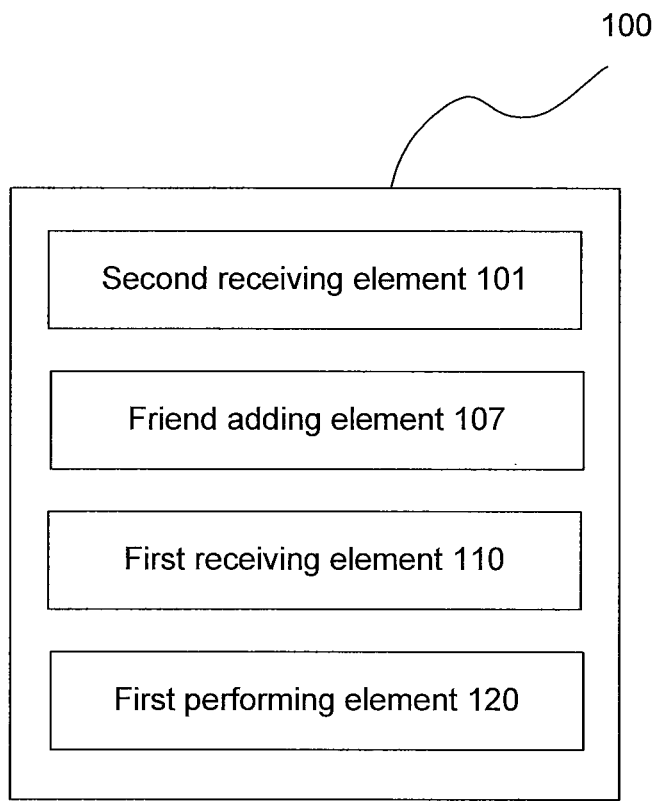
FIG. 9 is a structural schematic diagram of a device for sharing control rights of appliances according to another embodiment of the present disclosure.

FIG. 9 is a structural schematic diagram of a device for sharing control rights of appliances according to another embodiment of the present disclosure. As shown in FIG. 9, based on the above embodiment, the device for sharing control rights of appliances 100 further includes a second receiving element 101 and a friend adding element 107.

The second receiving element 101 is configured to receive, before the first receiving element receives the sharing request from the first user for sharing the control right of at least one appliance with the at least one second user, the friend adding request from the first user, and the friend adding request is used for adding the at least one second user as at least one friend of the first user. The friend adding element 107 is configured to add, in response to the friend adding request received by the second receiving element, the at least one second user as the at least one friend of the first user.

When the at least one second user is at least one friend of the first user, the control right of the at least one appliance managed by the first user is shared with the at least one second user. Therefore, the first user first requests for adding the at least one second user as the at least one friend, and then shares the control right of the at least one appliance with the at least one second user. Specifically, after the second receiving element 101 receives the friend adding request for adding the at least one second user as the at least one friend from the first user, the friend adding element 107 adds the at least one second user in the friend list of the first user. For example, the friend adding element 107 adds the account of the at least one second user. Furthermore, after the at least one second user is added as the at least one friend of the first user, a prompt message that the at least one second user has been added as the at least one friend is also returned to the first user.

Figure 10:
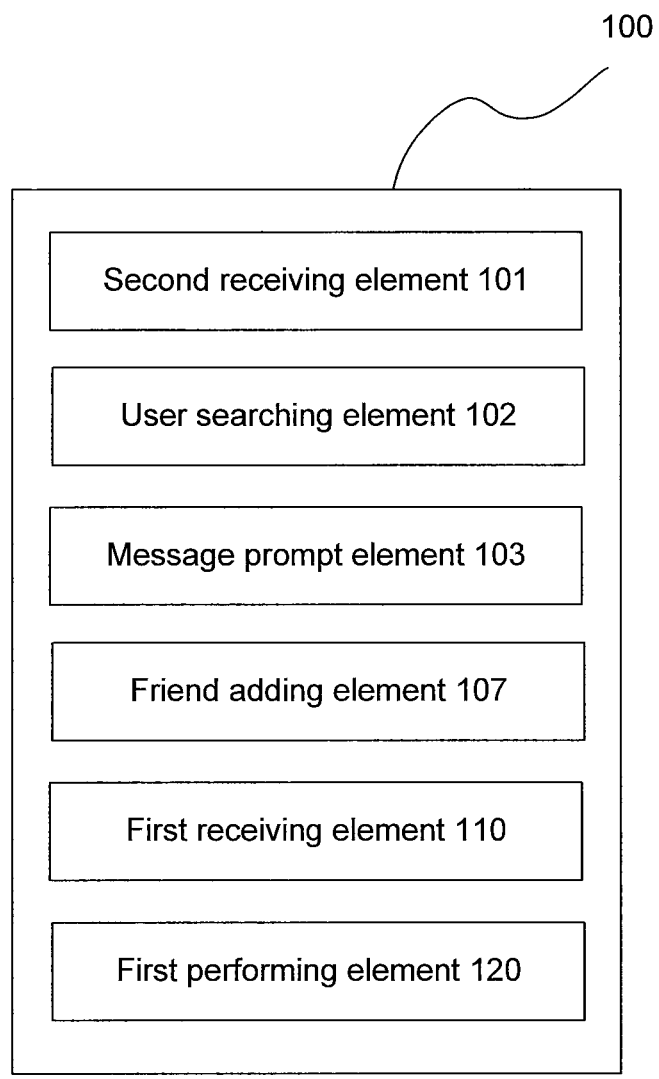
FIG. 10 is a structural schematic diagram of a device for sharing control rights of appliances according to another embodiment of the present disclosure.

FIG. 10 is a structural schematic diagram of a device for sharing control rights of appliances according to another embodiment of the present disclosure. As shown in FIG. 10, based on the above embodiment, the device for sharing control rights of appliances 100 further includes a user searching element 102 and a message prompt element 103.

The user searching element 102 is configured to search, according to the account information of the at least one second user carried in the friend adding request, to find out whether the at least one second user exists. The account information includes at least one of an e-mail address, a mobile phone number and a user name. The message prompt element 103 is configured to send, when the user searching element does not find the at least one second user, a prompt message to the first user, and the prompt message is used for prompting that the at least one second user does not exist. The friend adding element 107 is further configured to add, when the user searching element finds the at least one second user, the at least one second user as the at least one friend of the first user.

Figure 11:
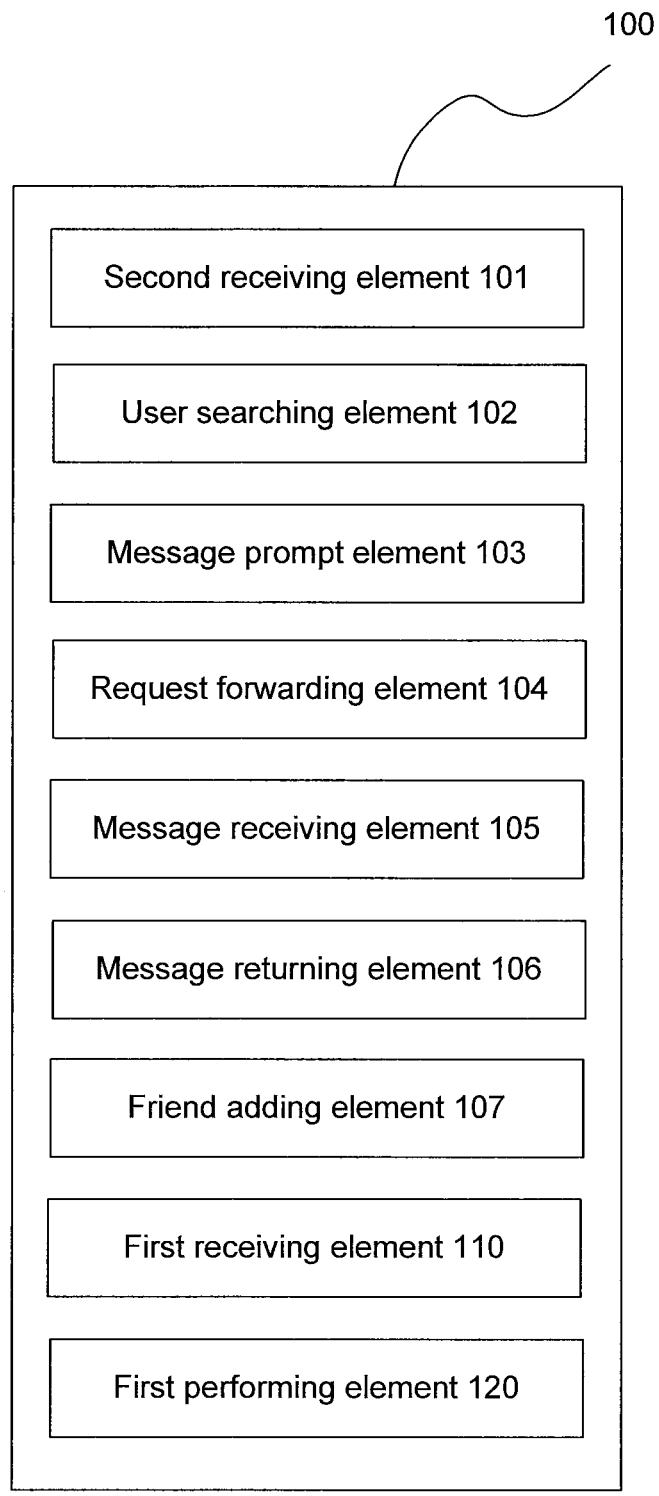
FIG. 11 is a structural schematic diagram of a device for sharing control rights of appliances according to another embodiment of the present disclosure.

FIG. 11 is a structural schematic diagram of a device for sharing control rights of appliances according to another embodiment of the present disclosure. As shown in FIG. 11, based on the above embodiment, the device for sharing control rights of appliances 100 further includes a request forwarding element 104, a message receiving element 105, and a message returning element 106.

The request forwarding element 104 is configured to forward the friend adding request received by the second element to the at least one second user. The message receiving element 105 is configured to receive the feedback message from the at least one second user, and the feedback message is used for indicating that the at least one second user agrees or rejects the friend adding request. The message returning element 106 is configured to return, when the message receiving element 105 receives the feedback message indicating that the at least one second user rejects the friend adding request from the at least one second user, a prompt message to the first user, and the prompt message is used for indicating that the at least one second user rejects the friend adding request. The friend adding element 107 is further configured to add, when the message receiving element 105 receives the feedback message indicating that the at least one second user agrees the friend adding request from the at least one second user, the at least one second user as the at least one friend of the first user.

If adding the at least one second user as the at least one friend needs the agreement of the at least one second user (for example, the at least one second user sets that an agreement is required to add a friend), the request forwarding element 104 forwards the friend adding request of the first user to the at least one second user when the second receiving element 101 receives the friend adding request for adding the at least one second user as the at least one friend sent by the first user. After receiving the forwarded friend adding request, if the at least one second user agrees to become at least one friend of the first user, the at least one second user returns the feedback message of agreeing the friend adding request. For example, the at least one second user clicks the "agree" button. When the at least one second user does not agree to become at least one friend of the first user, the at least one second user returns the feedback message indicating that the at least one second user rejects the friend adding request. For example, the at least one second user clicks the "reject" button. If the message receiving element 105 receives the feedback message indicating that the at least one second user rejects the friend adding request from the at least one second user, the message returning element 106 returns the prompt message that the at least one second user rejects the friend adding request to the first user. For example, after the feedback message that the at least one second user rejects the friend adding request is received, the prompt message "your friend adding request is rejected" is returned to the first user. If the message receiving element 105 receives the feedback message indicating that the at least one second user agrees the friend adding request from the at least one second user, the friend adding element 107 adds the at least one second user as the at least one friend of the first user.

Figure 12:
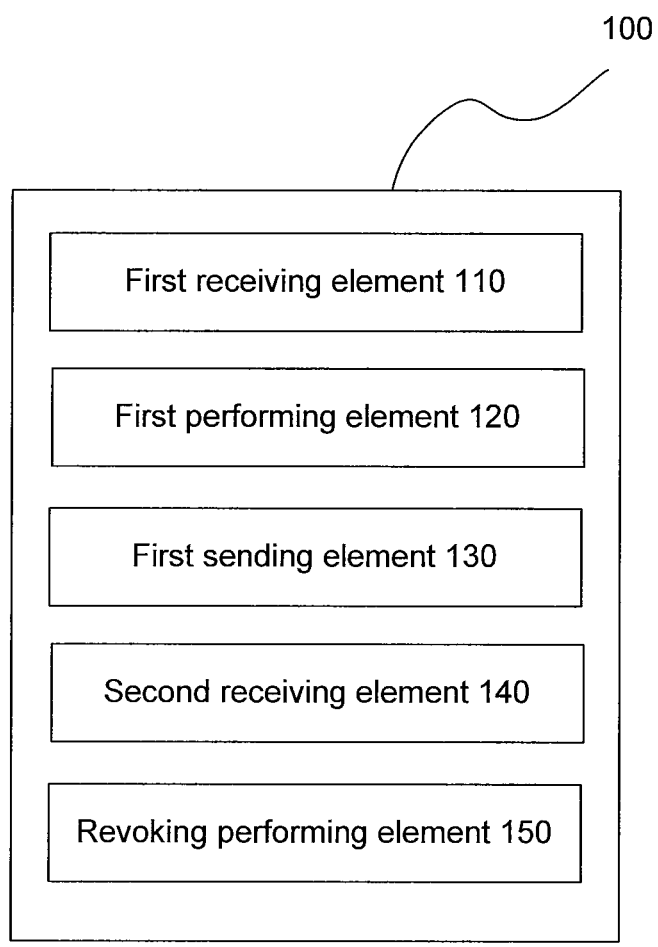
FIG. 12 is a structural schematic diagram of a device for sharing control rights of appliances according to another embodiment of the present disclosure.

FIG. 12 is a structural schematic diagram of a device for sharing control rights of appliances according to another embodiment of the present disclosure. As shown in FIG. 12, based on the above embodiment, the device for sharing control rights of appliances 100 further includes a second receiving element 140 and a revoking performing element 150.

The second receiving element 140 is configured to receive the revoking request from the first user, and the revoking request is used for revoking the control right of the at least one appliance of the at least one second user. The revoking performing element 150 is configured to revoke, in response to the revoking request received by the second receiving element, the control right of the at least one appliance of the at least one second user.

For example, when the first user does not want the at least one second user to help managing the appliances, the first user revokes the control right of the at least one second user, namely sending the revoking request for revoking the control right of the at least one appliance of the at least one second user. After the second receiving element 140 receives the revoking request from the first user for revoking the control right of the at least one appliance of the at least one second user, the revoking performing element 150 performs the operation of revoking the control right of the at least one appliance of the at least one second user. Specifically, the revoking performing element 150 deletes the control relationship between the at least one second user and the at least one appliance from the control relationship list.

In some embodiments of the present disclosure, a computer-readable storage medium corresponding to the method for sharing control rights of appliances is also provided. A computer program is stored on the computer-readable storage medium. When executed by a processor, the computer program implements the steps of any above method for sharing control rights of appliances.

In some embodiments of the present disclosure, a server corresponding to the method for sharing control rights of appliances is also provided. The server includes a processor, a memory, and a computer program which is stored on the memory and may be run on the processor. When executing the program, the processor implements the steps of any above method for sharing control rights of appliances.

In some embodiments of the present disclosure, a server is also provided. The server includes any above device for sharing control rights of appliances.

Accordingly, by means of the technical solutions provided by the present disclosure, the control right of the at least one appliance managed by the first user is shared with the at least one second user, thereby implementing the sharing of control rights of appliances, and further implementing joint management of the appliances by multiple users. In such a manner, when needing other users to manage an appliance, a user shares the control right of the appliance easily and quickly.

The functions described in the specification may be implemented in hardware, software executed by the processor, firmware or any combination thereof. When implemented in the software executed by the processor, these functions may be stored in a computer-readable medium or transmitted through the computer-readable medium as one or more instructions or codes. Other examples and implementation solutions fall within the scope and spirit of the present disclosure and the attached claims. For example, attributing to the nature of software, the functions described above may be implemented by the software executed by processors, hardware, firmware, hardwires or any combination of them. Moreover, all the function elements may be integrated in a processing element; or the elements exist separately and physically; or two or more than two elements are integrated in a element.

In the several embodiments provided in the application, it should be understood that the technical contents disclosed may be realized in other ways. The embodiment of the device described above is schematic; for example, the division of the elements is a division of logical functions, and there may be other dividing modes during the actual implementation, for example, multiple elements or components may be combined or integrated to another system, or some features may be ignored or are not executed. In addition, coupling, direct coupling, or communication connection shown or discussed may be implemented through indirect coupling or communication connection of some interfaces, elements or components, and may be in an electrical form or other forms.

The elements described as separate parts may be or may not be separate physically. The part as a control device may be or may not be a physical element, that is to say, it may be in a place or distributed on multiple network elements. Some or all of the elements may be selected according to actual needs to achieve the objectives of the solutions of the embodiments.

If the integrated element is implemented by software function components, and the software function components are sold or used as independent products, they may also be stored in a computer readable storage medium. Based on this understanding, the technical solution of the present disclosure substantially or the part making a contribution to the conventional art may be embodied in the form of software product; the computer software product is stored in a storage medium, and includes a number of instructions to make a computer device (which may be a personal computer, a server or a network device, etc.) perform all or part of steps of the method in each embodiment of the present disclosure. The storage media include, but not limited to, a USB flash disk, a Read-Only Memory (ROM), a Random Access Memory (RAM), a mobile hard disk, a magnetic disk, a compact disc, and other media capable of storing the program codes.

The above are embodiments of the present disclosure and are not intended to limit the present disclosure. For those skilled in the art, the present disclosure may have various modifications and changes. Any modifications, equivalent replacements, improvements and the like within the spirit and principle of the present disclosure should fall within the scope of the claims of the present disclosure.

What is claimed is:

1. A method for sharing control rights of appliances, comprising:
   receiving a sharing request from a first user for sharing a control right of at least one appliance with at least one second user, wherein the at least one appliance is selected by the first user from appliances which are managed by an account of the first user; and
   in response to the sharing request, performing a sharing operation of sharing the control right of the at least one appliance with the at least one second user, so that both the first user and the at least one second user share the control right of the at least one appliance;
   wherein performing the sharing operation of sharing the control right of the at least one appliance with the at least one second user comprises: adding a control relationship between an account of the at least one second user and the at least one appliance in a control relationship list, wherein the control relationship list is used for saving control relationships between users and appliances.

2. The method for sharing control rights of appliances as claimed in claim 1, further comprising:
   after performing the sharing operation of sharing the control right of the at least one appliance with the at least one second user, sending a notification message to the at least one second user, wherein the notification message is used for notifying that the at least one second user obtains the control right of the at least one appliance shared by the first user.

3. The method for sharing control rights of appliances as claimed in claim 1, wherein before adding the at least one second user as the at least one friend of the first user, the method further comprises:
   searching, according to account information of the at least one second user carried in the friend adding request, to find out whether the at least one second user exists, wherein the account information comprises at least one of an e-mail address, a mobile phone number and a user name;
   when the at least one second user is not found, sending a prompt message to the first user, wherein the prompt message is used for prompting that the at least one second user does not exist; and
   when the at least one second user is found, adding the at least one second user as the at least one friend of the first user.

4. The method for sharing control rights of appliances as claimed in claim 1, wherein before adding the at least one second user as the at least one friend of the first user, the method further comprises:
   forwarding the friend adding request to the at least one second user;
   receiving a feedback message from the at least one second user, wherein the feedback message is used for indicating that the at least one second user agrees or rejects the friend adding request;
   when the feedback message indicating that the at least one second user rejects the friend adding request is received, returning a prompt message to the first user, wherein the prompt message is used for indicating that the at least one second user rejects the friend adding request;
   when the feedback message indicating that the at least one second user agrees the friend adding request is received from the at least one second user, adding the at least one second user as the at least one friend of the first user.

5. The method for sharing control rights of appliances as claimed in claim 1, further comprising:
   receiving a revoking request from the first user, wherein the revoking request is used for revoking the control right of the at least one appliance of the at least one second user; and
   in response to the revoking request, revoking the control right of the at least one appliance of the at least one second user.

6. The method for sharing control rights of appliances as claimed in claim 5, wherein revoking the control right of the at least one appliance of the at least one second user comprises:
   deleting the control relationship between the at least one second user and the at least one appliance from the control relationship list, wherein the control relationship list is used for saving control relationships between users and appliances.

7. A device for sharing control rights of appliances, comprising:
   a first receiving element, configured to receive a sharing request from a first user for sharing a control right of at least one appliance with at least one second user, wherein the at least one appliance is selected by the first user from appliances which are managed by an account of the first user; and
   a first performing element, configured to perform, in response to the sharing request received by the first receiving element, a sharing operation of sharing the control right of the at least one appliance with the at least one second user, so that both the first user and the at least one second user share the control right of the at least one appliance;
   wherein performing, by the first performing element, the sharing operation of sharing the control right of the at least one appliance with the at least one second user comprises: adding a control relationship between an account of the at least one second user and the at least one appliance in a control relationship list, wherein the control relationship list is used for saving control relationships between users and appliances.

8. The device for sharing control rights of appliances as claimed in claim 7, further comprising:
   a first sending element, configured to send, after the first performing element performs the sharing operation of sharing the control right of the at least one appliance with the at least one second user, a notification message to the at least one second user, wherein the notification message is used for notifying that the at least one second user obtains the control right of the at least one appliance shared by the first user.

9. The device for sharing control rights of appliances as claimed in claim 7, further comprising:
   a user searching element, configured to search, according to account information of the at least one second user carried in the friend adding request, to find out whether the at least one second user exists, wherein the account information comprises at least one of an e-mail address, a mobile phone number and a user name; and a message prompt element, configured to send, when the user searching element does not find the at least one second user, a prompt message to the first user, wherein the prompt message is used for prompting that the at least one second user does not exist;

the friend adding element is further configured to add, when the user searching element finds the at least one second user, the at least one second user as the at least one friend of the first user.

10. The device for sharing control rights of appliances as claimed in claim 7, further comprising:

a request forwarding element, configured to forward the friend adding request received by the second element to the at least one second user;

a message receiving element, configured to receive a feedback message from the at least one second user, wherein the feedback message is used for indicating that the at least one second user agrees or rejects the friend adding request;

a message returning element, configured to return, when the message receiving element receives the feedback message indicating that the at least one second user rejects the friend adding request from the at least one second user, a prompt message to the first user, wherein the prompt message is used for indicating that the at least one second user rejects the friend adding request;

the friend adding element is further configured to add, when the message receiving element receives the feedback message indicating that the at least one second user agrees the friend adding request from the at least one second user, the at least one second user as the at least one friend of the first user.

11. The device for sharing control rights of appliances as claimed in claim 7, further comprising:

a second receiving element, configured to receive a revoking request from the first user, wherein the revoking request is used for revoking the control right of the at least one appliance of the at least one second user; and a revoking performing element, configured to revoke, in response to the revoking request received by the second receiving element, the control right of the at least one appliance of the at least one second user.

12. The device for sharing control rights of appliances as claimed in claim 11, wherein revoking, by the revoking performing element, the control right of the at least one appliance of the at least one second user comprises:

deleting the control relationship between the at least one second user and the at least one appliance from the control relationship list, wherein the control relationship list is used for saving control relationships between users and appliances.

13. A non-transitory computer-readable storage medium, on which a computer program is stored; when executed by a processor, the computer program implements steps of a method for sharing control rights of appliances as claimed in claim 1.

14. A server, comprising: a processor, a memory, and a computer program stored on the memory and capable of running on the processor; when executing the program, the processor implements steps of a method for sharing control rights of appliances as claimed in claim 1.

15. A server, comprising a device for sharing control rights of appliances as claimed in claim 7.

* * * * *